(12) United States Patent
Kimbrell et al.

(10) Patent No.: US 9,494,753 B2
(45) Date of Patent: Nov. 15, 2016

(54) CYLINDRICAL HOUSING WITH LOCKING RING

(71) Applicant: AFL Telecommunications LLC, Duncan, SC (US)

(72) Inventors: Eddie Kimbrell, Dacula, GA (US); Ted Lichoulas, Simpsonville, SC (US); John Toth, Clemont, FL (US)

(73) Assignee: AFL Telecommunications LLC, Duncan, SC (US)

( * ) Notice: Subject to any disclaimer, the term of this patent is extended or adjusted under 35 U.S.C. 154(b) by 31 days.

(21) Appl. No.: 14/347,941

(22) PCT Filed: Mar. 20, 2013

(86) PCT No.: PCT/US2013/033150
§ 371 (c)(1),
(2) Date: Mar. 27, 2014

(87) PCT Pub. No.: WO2013/142600
PCT Pub. Date: Sep. 26, 2013

(65) Prior Publication Data
US 2014/0248024 A1    Sep. 4, 2014

Related U.S. Application Data

(60) Provisional application No. 61/613,106, filed on Mar. 20, 2012.

(51) Int. Cl.
G02B 6/44 (2006.01)
H02G 15/115 (2006.01)
H02G 15/14 (2006.01)

(52) U.S. Cl.
CPC .......... *G02B 6/4427* (2013.01); *H02G 15/115* (2013.01); *G02B 6/4428* (2013.01); *G02B 6/4454* (2013.01); *H02G 15/14* (2013.01)

(58) Field of Classification Search
CPC .......................... G02B 6/4427; H02G 15/115
See application file for complete search history.

(56) References Cited

U.S. PATENT DOCUMENTS

| 4,653,846 A | 3/1987 | Yamazaki et al. |
| 4,767,173 A | 8/1988 | Priaroggia |
| 5,675,120 A | 10/1997 | Craft et al. |
| 6,568,266 B1 | 5/2003 | Desa et al. |

OTHER PUBLICATIONS

International Search Report for PCT/US2013/033150 dated Jun. 10, 2013.

*Primary Examiner* — Jerry Rahll
(74) *Attorney, Agent, or Firm* — Dority & Manning, P.A.

(57) ABSTRACT

A pressure apparatus including a first end cap, a second end cap, a hollow housing connected to the first and second end caps, a locking ring connected to the second end cap, a first termination connected to the first end cap, and a second termination connected to the second end cap.

14 Claims, 13 Drawing Sheets

CYLINDRICAL HOUSING WITH LOCKING RING

CROSS-REFERENCE TO RELATED APPLICATIONS

This application is based upon and claims the benefit of priority from U.S. Provisional Application No. 61/613,106, filed Mar. 20, 2012, in the United States Patent and Trademark Office, the disclosures of which are incorporated herein in its entirety by reference.

BACKGROUND

1. Field

The invention is related to a pressure housing assembly, and more particularly to pressure housing assembly suitable for use in underwater environments.

2. Related Art

One of the key challenges in subsea system design is to provide a one atmosphere hollow pressure vessel attached to transmission cables that can be used to house components needed in various subsea industries such as communications, defense and offshore oil and gas markets with the ability to withstand the hydrostatic pressures of deep and ultra-deep sea environments. Designing this type of pressure vessel to be hermetically sealed and resistant to corrosion while making the pressure housing capable of being re-entered if necessary has proven to be a significant design challenge. In communications and control systems, it is common practice to package or splice copper and/or fiber optic conductors in pressure vessels that are connected to a cable. One significant challenge has been to maintain the structural integrity of the pressure vessel housing while keeping the overall weight as light as possible for assembly and deployment purposes. Many methods have been employed to solve these technical problems. These methods typically require separate mechanical parts or sub-assemblies that are bolted or welded together to form the complete pressure vessel assembly. This welded method does not allow re-entry into the pressure vessel if needed during the manufacturing, testing and handling prior to deployment. The bolted case and cover method requires a significant number of high strength fasteners and extra material around the fasteners to transfer the load into the housing components resulting in thick walled housings.

Some of the conventional technology/methodology includes:

1. All metal pressure housing with one or more bolted on end caps;
2. Pressure housings with end caps that are attached via internal screw threads;
3. Pressure housings with external slide shell configuration requiring internal axial load end-cap support structure;
4. All metal pressure housing vessel with welded case and cover type construction;
5. Two piece all metal "clam-shell" type construction;
6. Non-metallic pressure vessel housing; and
7. Hybrid pressure vessel construction using metallic and non-metallic construction components.

Re-entry into the enclosure is needed if a problem is encountered during any of the critical assembly phases or if other problems arise that cannot be fixed externally. The current invention provides a logical means to provide a one atmosphere, hermetically sealed pressure vessel that can withstand the effects of high hydrostatic pressure and allow for re-entry into the pressure vessel at any time to access the contents of the pressure vessel while not compromising any part of the pressure vessel during disassembly and reassembly.

SUMMARY

Exemplary implementations of the present invention address the problems and/or disadvantages of the current technology/methodology described above. Although the present invention is not required to overcome all of the disadvantages described above, an exemplary implementation of the present invention may address the above disadvantages, and further disadvantages not described above, or may not overcome any of the problems listed above while still providing improved methodology and enhancement to the present art.

One embodiment of the present invention utilizes a single self-supporting slide shell, not requiring a separate internal support structure, while still supporting an application pressure of many thousands of pounds per square inch. When the pressure housing shell itself provides the internal support, the number of components are reduced and the usable volume inside the pressure vessel increases.

Other features of the embodiment may include a simplified threaded closure ring that secures the self-supporting slide shell in place without the requirement of multiple fasteners and protracted assembly times.

Another embodiment of the invention is a pressure apparatus including a first end cap, a second end cap, a hollow housing connected to the first and second end caps, a locking ring connected to the second end cap, a first termination connected to the first end cap, and a second termination connected to the second end cap.

Other features of the embodiment may include a bridge structure connected to at least one of the first and second end caps, an electrical and or fiber assembly connected to the bridge structure, the terminations being armored terminations, the terminations being epoxy glands, the terminations being penetrators, the housing being cylindrical, the locking ring axially aligning and seating the second end cap with the pressure apparatus.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
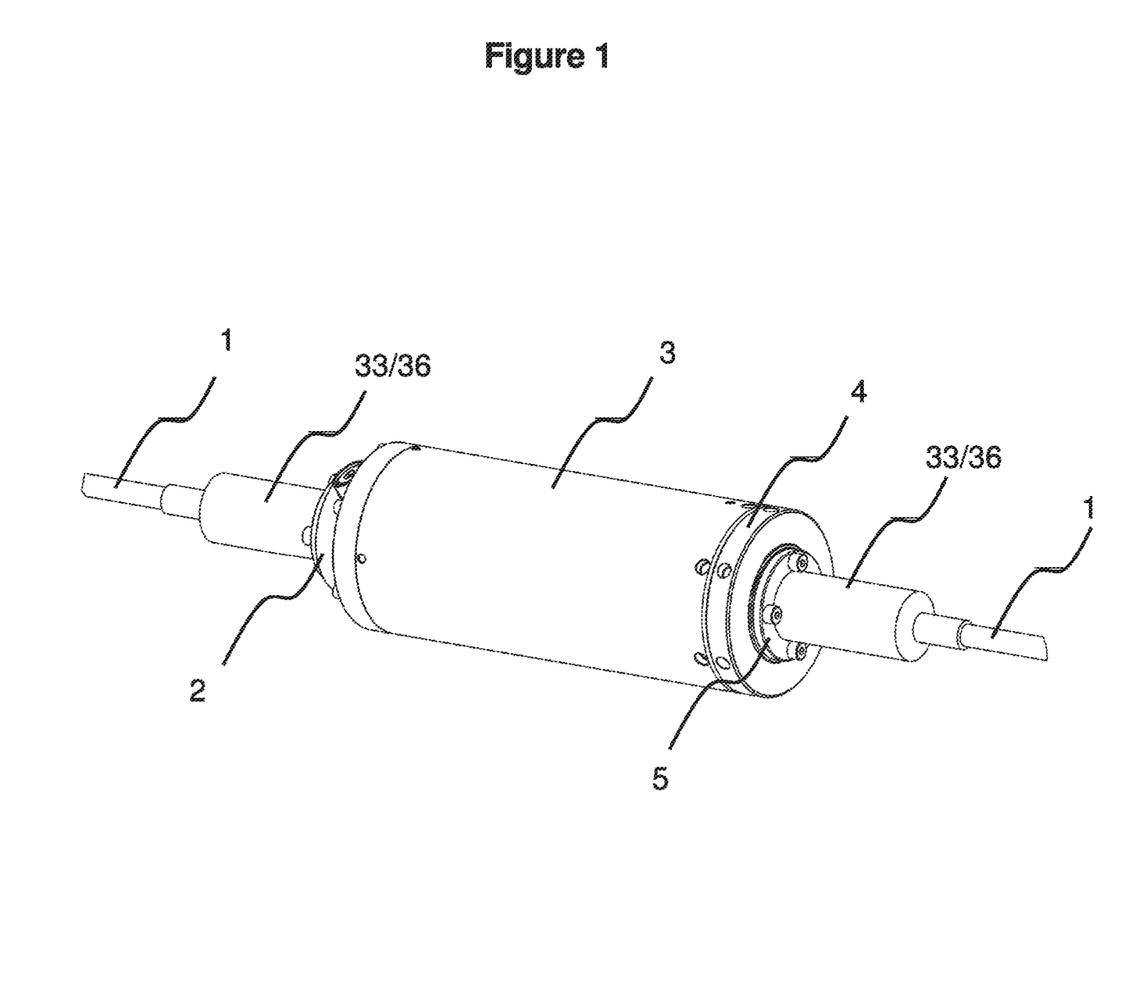
FIG. 1 shows an isometric view of an exemplary embodiment of an assembled slide cylinder pressure vessel.

FIG. 1 shows an isometric view of an exemplary embodiment of an assembled slide cylinder pressure vessel. Some of the major components are identified and the pressure vessel in this instance is shown connected to a cable 1 on each end. The vessel includes a slide cylinder pressure housing 3, a first end cap 2, a second end cap 5, an end cap locking ring 4 and terminations 33, such as an armored termination, epoxy gland, penetrator, etc. In this embodiment, the terminations 33 are underneath a pre-overmolded polyurethane boot 36. Details of these components are shown in the following figures. The vessel has been designed such that internal pressure support structures are not required inside the slide cylinder pressure housing 3. Also, the pressure vessel is designed to provide a full cable break strength axial loading path while concurrently supporting the longitudinal and radial loading requirements of high pressure applications.

Figure 2A:
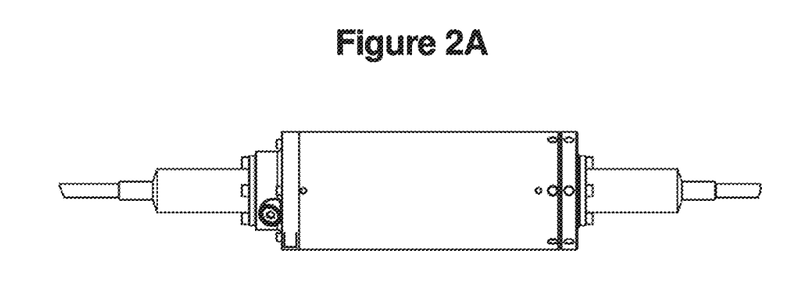
FIGS. 2A-2D show orthographic views of an exemplary embodiment of an assembled slide cylinder pressure vessel.
Figure 2B:
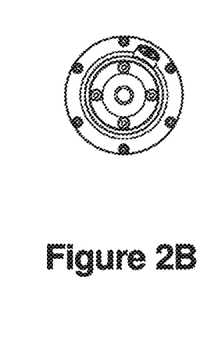
Figure 2C:
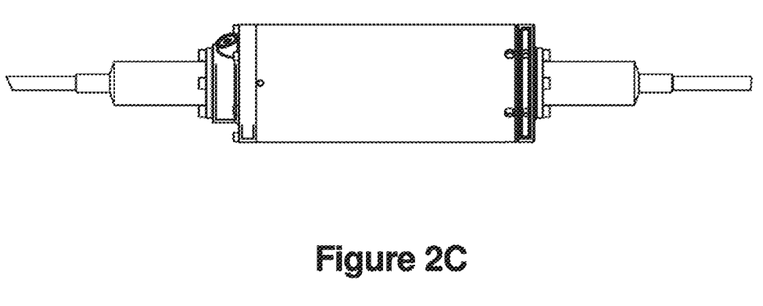
Figure 2D:
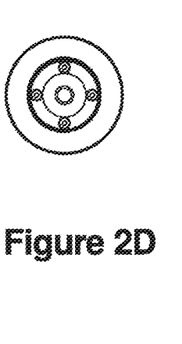

FIGS. 2A-2D show orthographic views of an exemplary embodiment of an assembled slide cylinder pressure vessel. FIG. 2A shows an overhead view, FIG. 2C shows a side view, FIG. 2B shows an end view of the end cap 2 side and FIG. 2D shows an end view of the end cap 5 side.

Figures 3A, 3B:
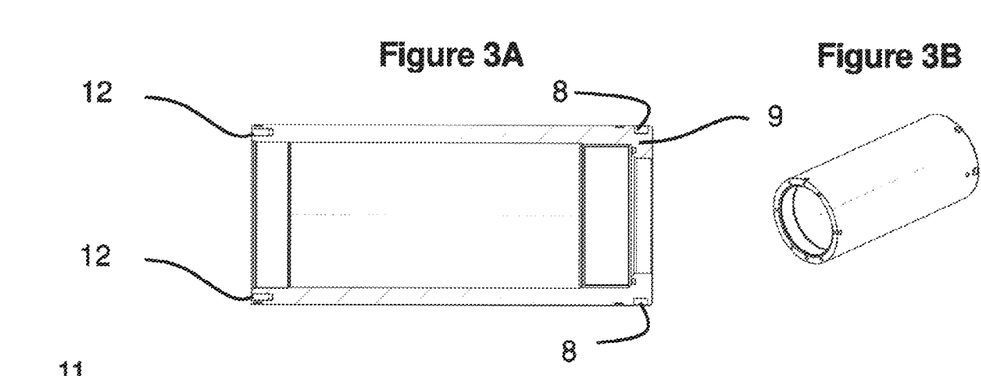
FIGS. 3A-3E shows an exemplary embodiment of the slide cylinder pressure housing.
Figure 3C:
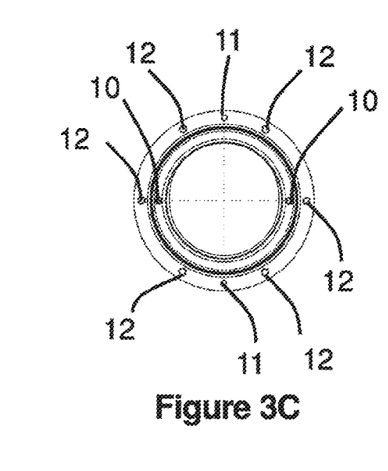
Figure 3D:
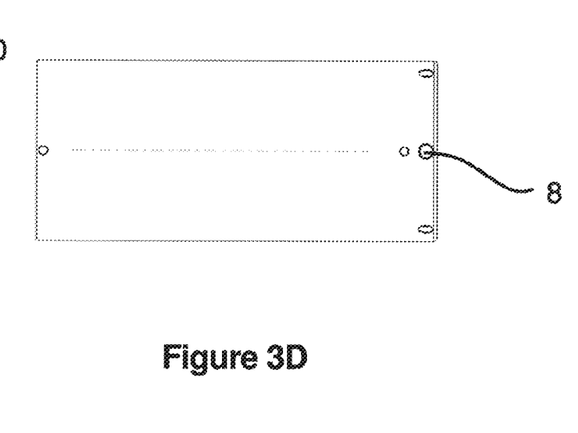
Figure 3E:
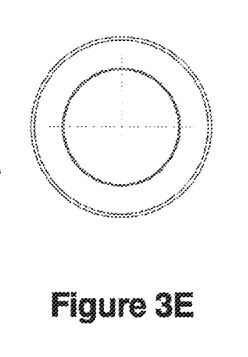

FIGS. 3A-3E shows an exemplary embodiment of the slide cylinder pressure housing 3. FIG. 3A shows a side cross-sectional view, FIG. 3D shows a side or top view, FIG. 3B shows in isometric, FIG. 3C shows an end view of the end cap 2 side and FIG. 3E shows an end view of the end cap 5 side. The slide cylinder pressure housing 3 is made of precipitation hardened stainless steel, however, it could also be made of other materials, such as super duplex alloys, titanium, or copper beryllium. The slide cylinder pressure housing 3 contains six screw holes 12 for connecting the end cap 2 to the slide cylinder pressure housing 3, two dowel holes 11 for connecting the end cap 2 to the slide cylinder pressure housing 3, two dowel holes 10 for connecting the end cap 5 to slide cylinder pressure housing 3 and two spanner wrench holes 8. There is also a shoulder 9 on the end cap 5 side of the housing to keep the end cap 5 against the slide cylinder pressure housing 3 when the locking ring 4 is tightened on the end cap 5. The slide cylinder pressure housing 3 can have different lengths, diameters and thicknesses in order to accommodate different types of components and assemblies, and to maximize the usable internal volume.

Figure 4A:
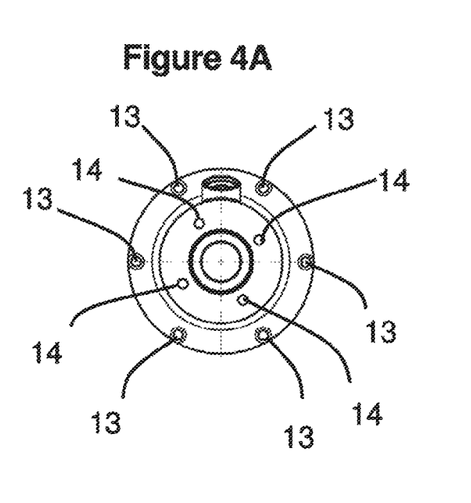
FIGS. 4A-4E show various views of an exemplary embodiment of the end cap 2.
Figures 4B, 4C:
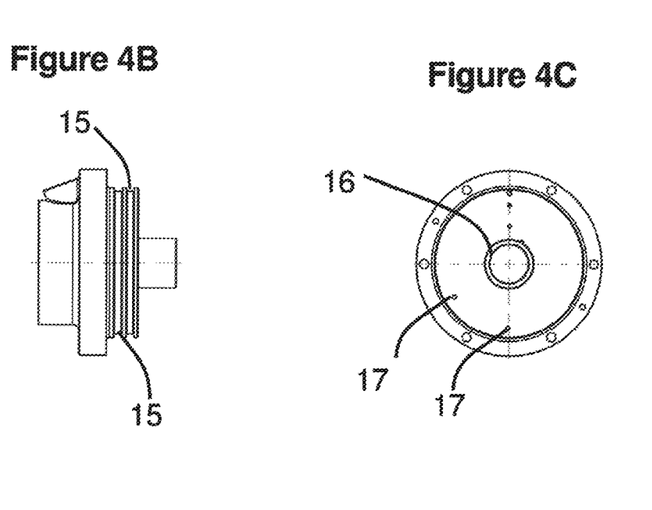
Figure 4D:
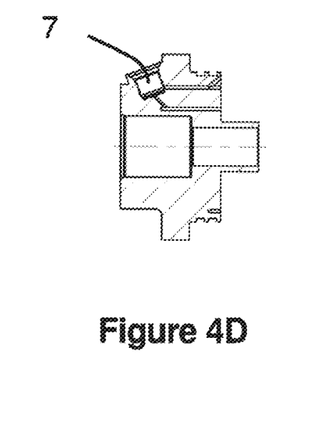
Figure 4E:
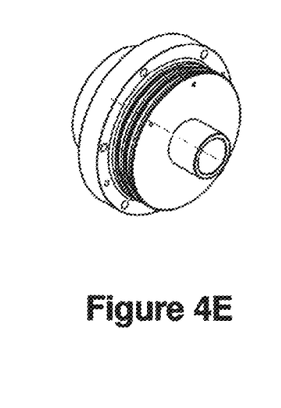

FIGS. 4A-4E show various views of an exemplary embodiment of the end cap 2. FIG. 4A is an exterior end view, FIG. 4B is a side view, FIG. 4C is an interior end view, FIG. 4D is a side cross-sectional view and FIG. 4E is an isometric view. The end cap 2 contains six screw holes 13 for connecting the end cap 2 to the slide cylinder pressure housing 3, four screw holes 14 for connecting the termination 33 to end cap 2 and two screw holes 17 utilized to connect bridge structure 27 to end cap 2. The end cap 2 also includes two O-ring grooves 15 for connecting the end cap 2 to the slide cylinder pressure housing 3 and a pass through hole 16 for the termination 33. A nitrogen or inert gas purge plug 7 runs from the exterior of the pressure housing to the low pressure interior. The end cap 2 is made of precipitation hardened stainless steel, however, it could also be made of other materials, such as super duplex alloys, titanium, or copper beryllium.

Figure 5A:
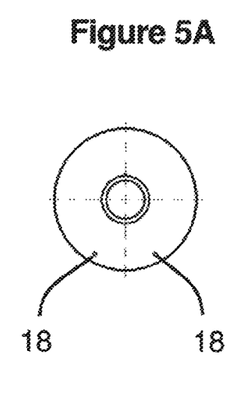
FIGS. 5A-5E show various views of an exemplary embodiment of the end cap 5.
Figure 5B:
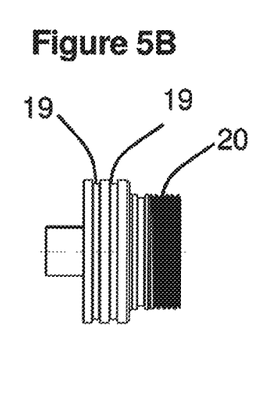
Figure 5C:
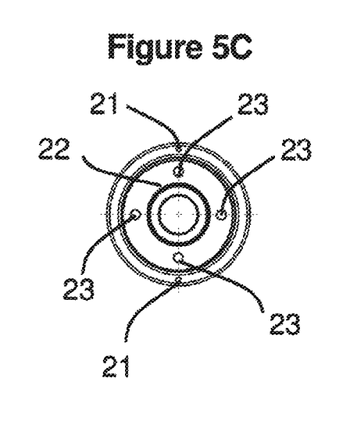
Figure 5D:
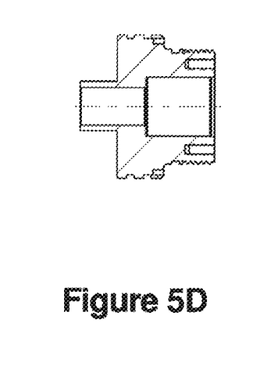
Figure 5E:
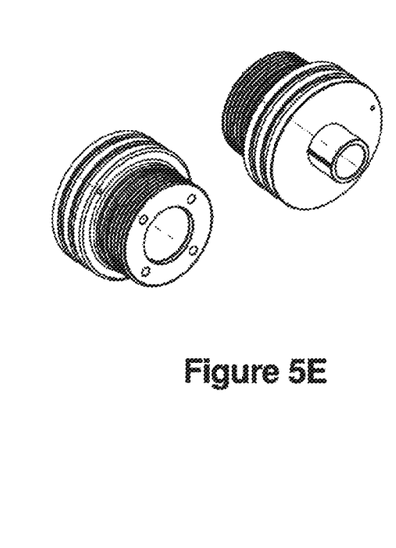

FIGS. 5A-5E show various views of an exemplary embodiment of the end cap 5. FIG. 5A is an interior end view, FIG. 5B is a side view, FIG. 5C is an exterior end view, FIG. 5D is a side cross-sectional view and FIG. 5E shows isometric views. The end cap 5 contains two dowel pins 21 for connecting the end cap 5 to the slide cylinder pressure housing 3, four screw holes 23 for connecting the termination to end cap 5 and two screw holes 18 for connecting the bridge structure 27 to end cap 5. The end cap 5 also includes two O-ring grooves 19 for O-rings 39 which create a seal between end cap 5 and slide cylinder pressure housing 3, a threaded surface 20 for attachment to the locking ring 4, and a pass through hole 22 for the termination 33. The end cap 5 is made of precipitation hardened stainless steel, however, it could also be made of other materials, such as super duplex alloys, titanium, or copper beryllium.

Figure 6A:
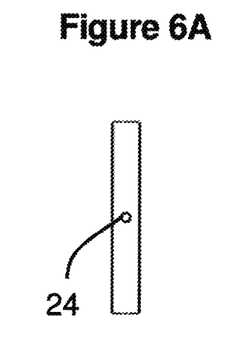
FIGS. 6A-6D show various views of an exemplary embodiment of the locking ring.
Figure 6B:
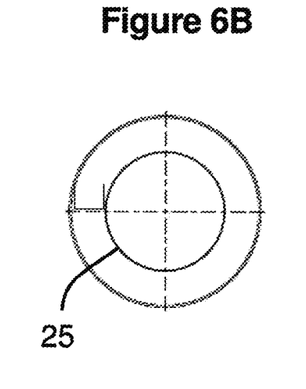
Figure 6C:
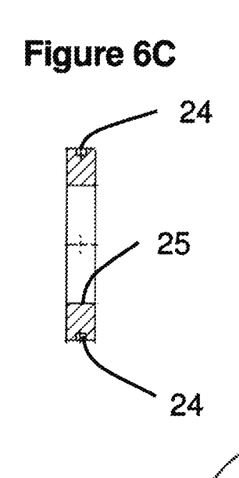
Figure 6D:
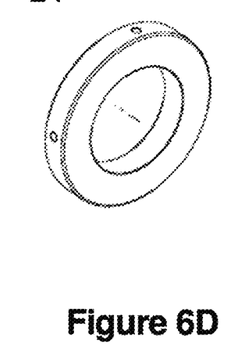

FIGS. 6A-6D show various views of an exemplary embodiment of the locking ring 4. FIG. 6A is a side view, FIG. 6B is an end view, FIG. 6C is a side cross-sectional view, and FIG. 6D is an isometric view. Locking ring 4 includes 6 spanner wrench holes 24 and a threaded interior surface 25 for attachment to end cap 5. The locking ring 4 is made of precipitation hardened stainless steel, however, it could also be made of other materials, such as super duplex alloys, titanium, or copper beryllium. The locking ring 4 secures the end cap 5 and replaces the need for multiple fasteners. The locking ring 4 also axially aligns and seats the end cap 5 with the pressure vessel.

Figure 7A:
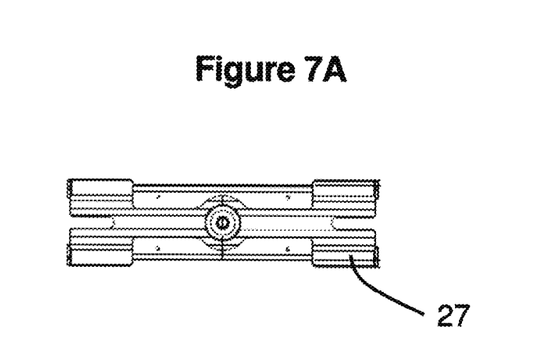
FIGS. 7A-7D show various views of an exemplary embodiment of the bridge plate.
Figures 7B, 7C:
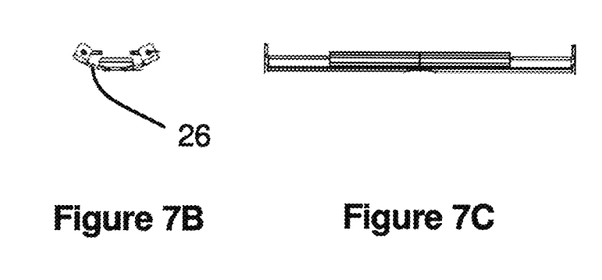
Figure 7D:
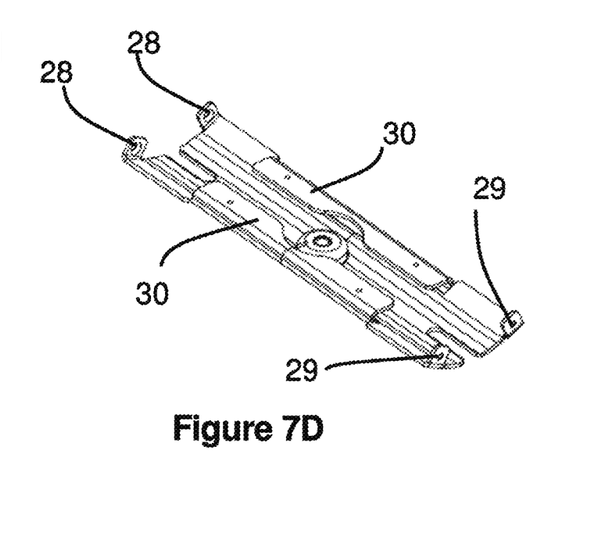

FIGS. 7A-7D show various views of an exemplary embodiment of the bridge structure 27. FIG. 7A is a top view, FIG. 7B is an end view, FIG. 7C is a side view and FIG. 7D is an isometric view. Bridge structure 27 has a rounded surface 26 for a better fit into slide cylinder pressure housing 3 and flat coplanar surfaces 30, which can be used to mount fiber and/or electrical assemblies and components. Bridge structure 27 also has two mounting tabs/holes 28 for mounting to end cap 2 and two mounting tabs/holes 29 for mounting to end cap 5. The bridge structure 27 is made of stainless steel, however, it could also be made of other materials, such as aluminum or plastic. The length of the bridge structure will vary, depending on the length of the slide cylinder pressure housing 3. In this embodiment, the bridge structure 27 is not designed to provide internal pressure support. However, in other embodiments, the bridge structure 27 could provide internal pressure support. In addition, more than one bridge structure could be mounted inside the slide cylinder pressure housing 3.

Figure 8:
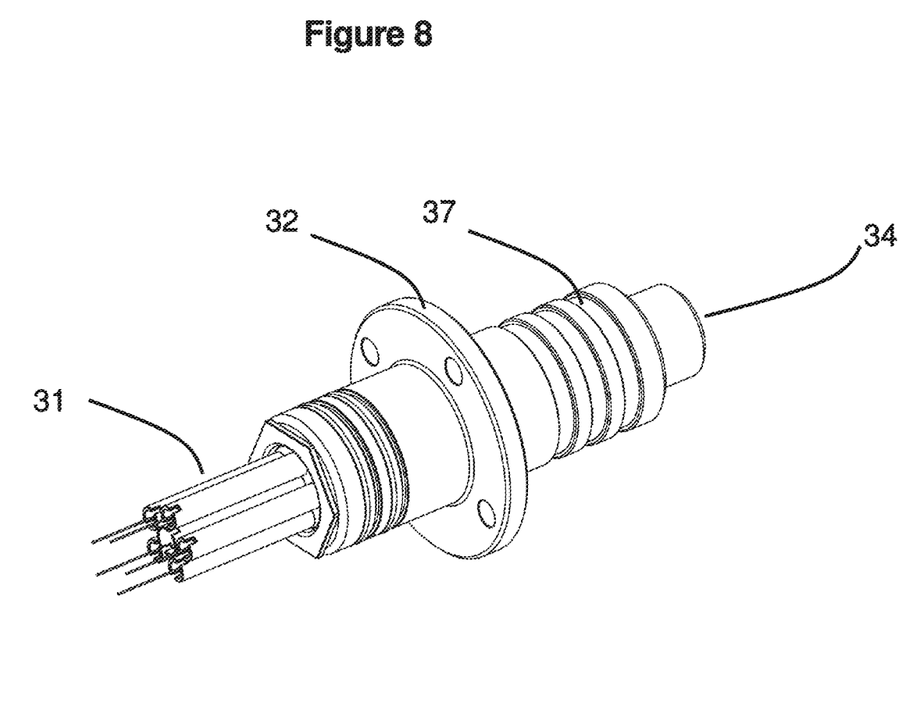
FIG. 8 shows an exemplary embodiment of a termination.

FIG. 8 shows an exemplary embodiment of the termination 33 containing a mounting flange 32, to secure the termination to the end caps and grooves 37 to facilitate polyurethane overmold adhesion. The termination 33 also contains a cable entry hole 34 and fiber feed through tubes 31. The termination 33 is made of precipitation hardened stainless steel, however, it could also be made of other materials, such as super duplex alloys, titanium, or copper beryllium. The terminations are designed and configured to support the full cable break strength of cables used with the vessel.

Figure 9:
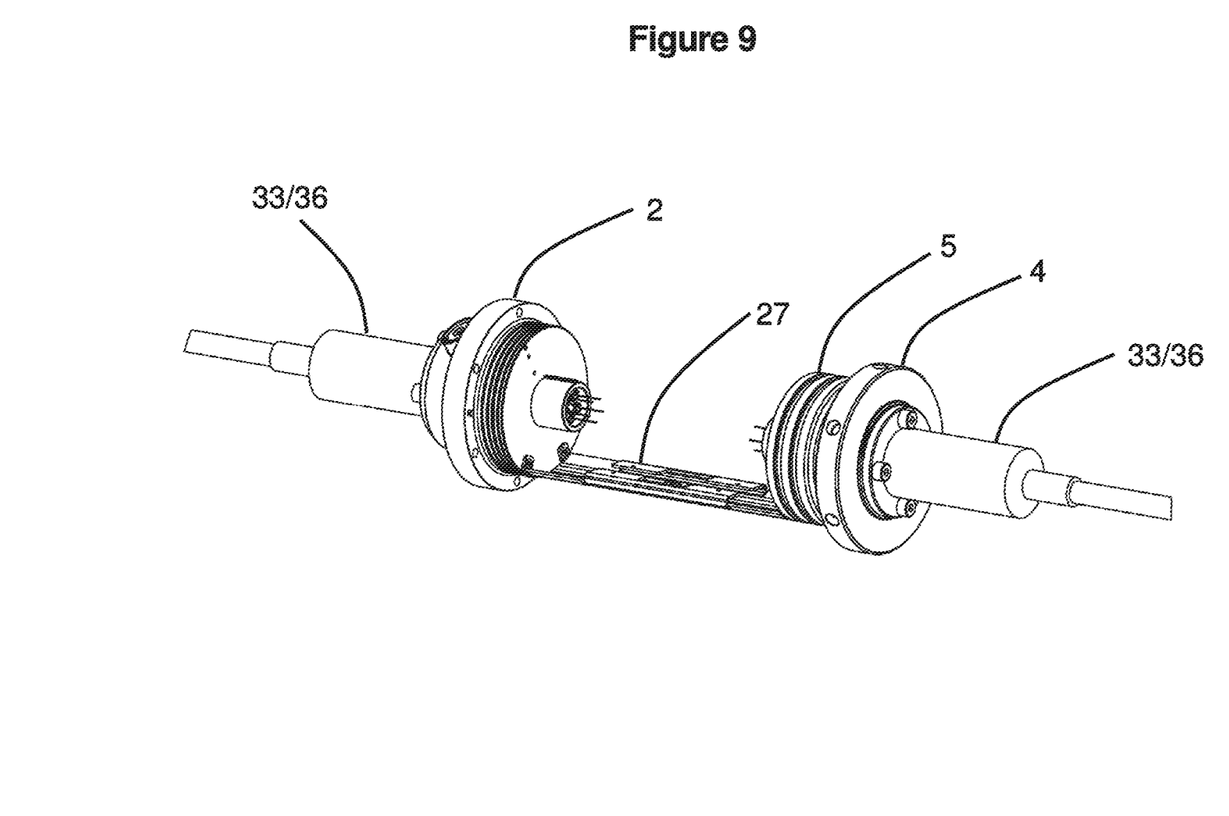
FIG. 9 shows an exemplary embodiment of the end cap 2 and end cap 5 sub-assembly.

FIG. 9 shows an exemplary embodiment of the end cap 2 and end cap 5 sub-assembly without the slide cylinder pressure housing 3. This figure shows the bridge structure 27 mounted to the end caps and the locking ring 4 mounted on the end cap 5.

Figure 10:
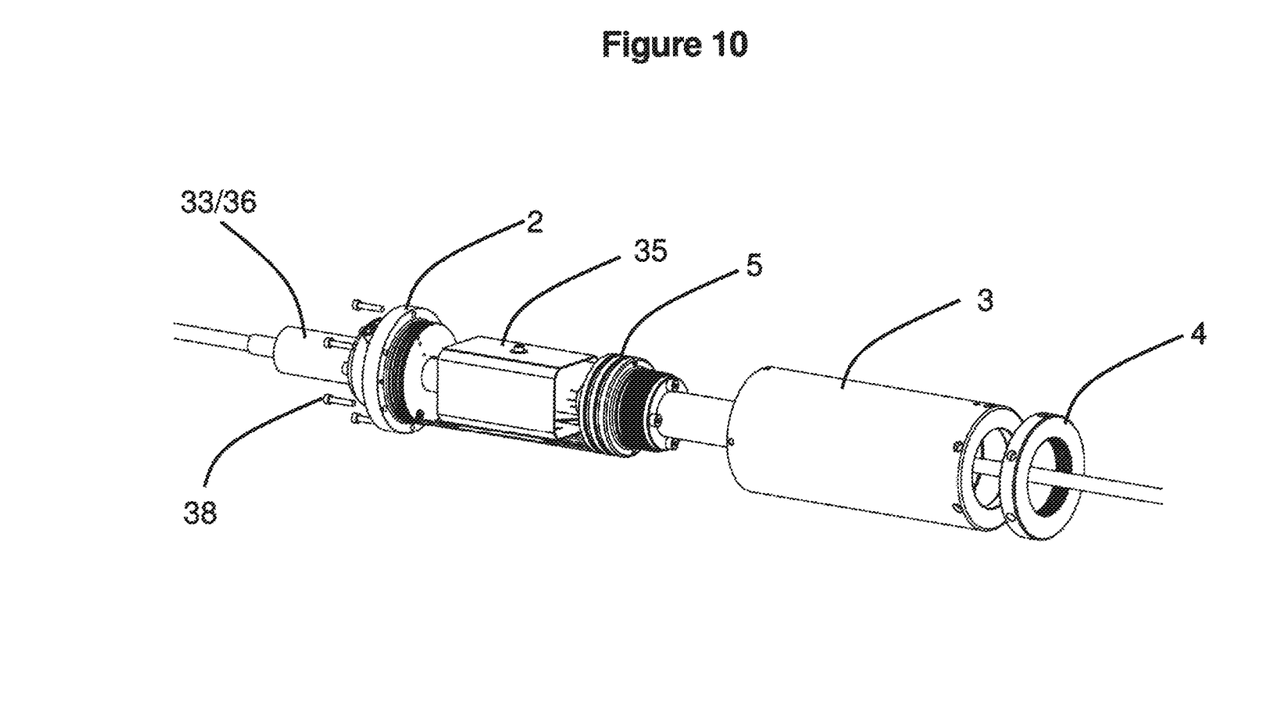
FIG. 10 shows an isometric exploded view of an exemplary embodiment of the slide cylinder pressure vessel.

FIG. 10 shows an isometric exploded view of an exemplary embodiment of the slide cylinder pressure vessel. This figure shows an assembly 35 (such as a splice tray) mounted on the bridge structure 27 which fits inside the slide cylinder pressure housing 3 and mounting bolts 38.

Figure 11:
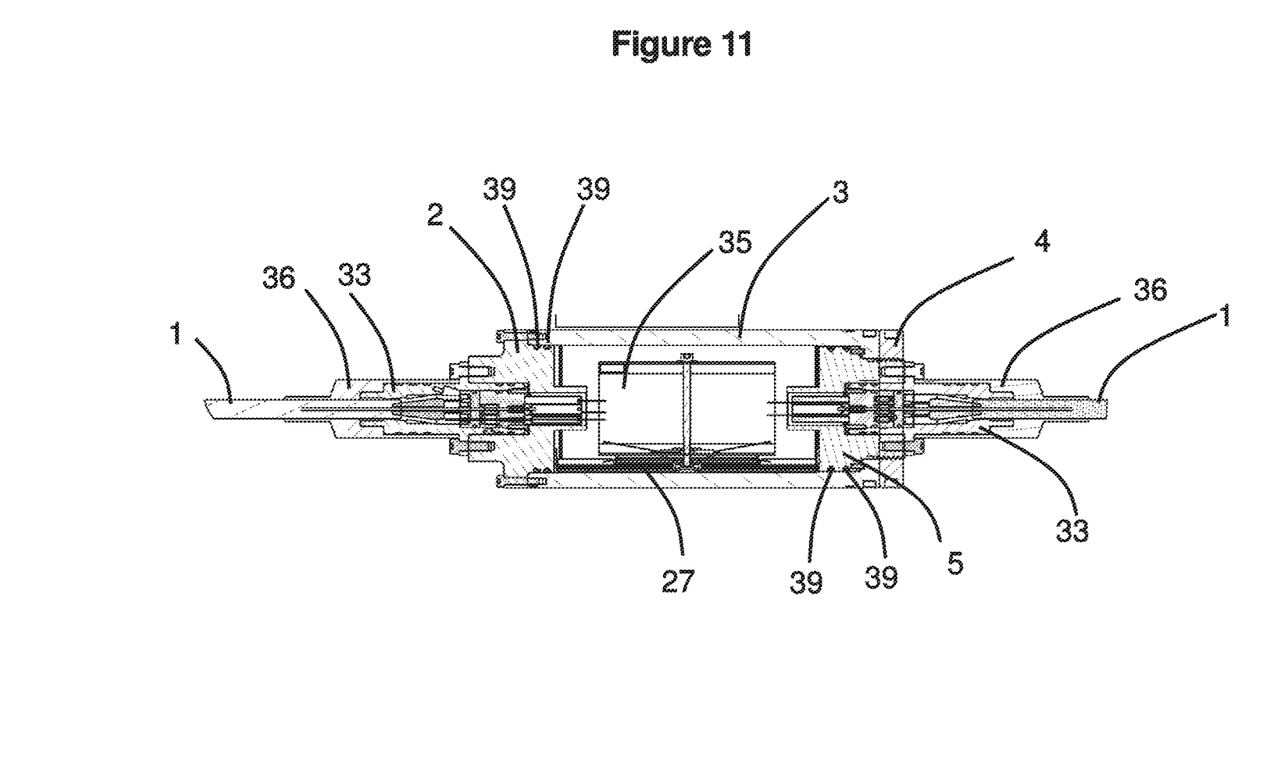
FIG. 11 shows a cross section of an exemplary embodiment of the slide cylinder pressure vessel.

FIG. 11 shows a cross section of an exemplary embodiment of the slide cylinder pressure vessel. In this assembled view, pre-overmolded polyurethane boot 36 is shown bolted to the end caps and the end caps are shown bolted to the slide cylinder pressure housing 3. Also shown are O-rings 39 which create a seal between the end caps and the slide cylinder pressure housing 3.

Figure 12:
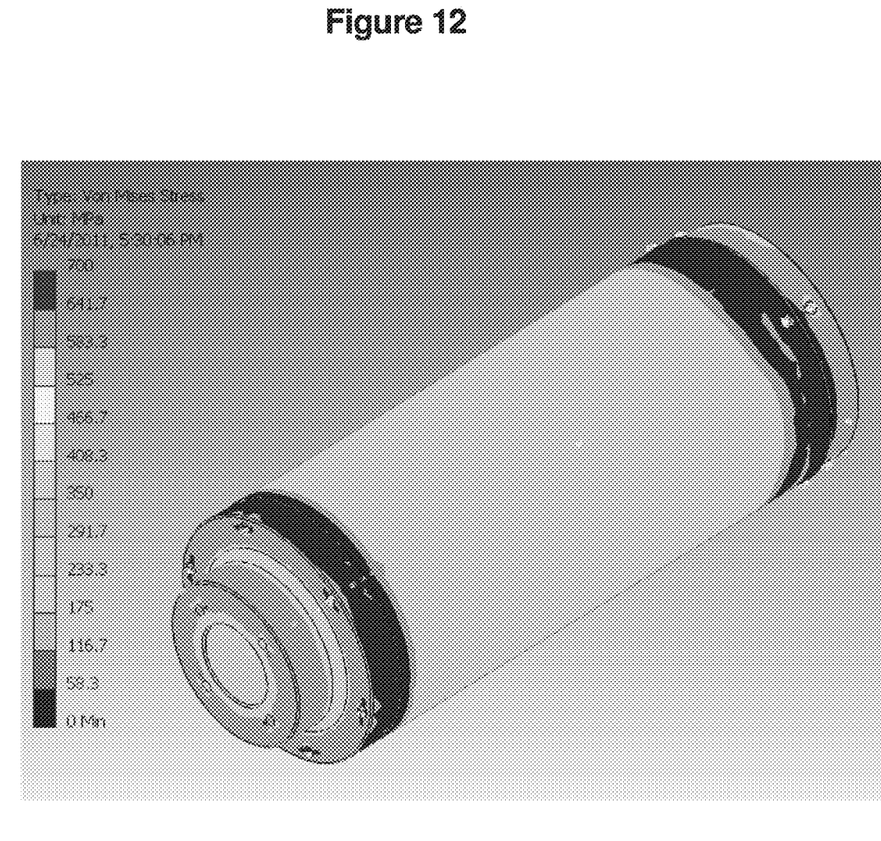
FIG. 12 shows FEA Pressure Analysis results.

FIG. 12 shows FEA Pressure Analysis results. FEA (finite element analysis) shows an even distribution of hydrostatic pressure about the surface of the slide cylinder pressure housing 3, indicating no stress concentration. This result suggests the design is suitable for full ocean pressures.

Figure 13A:
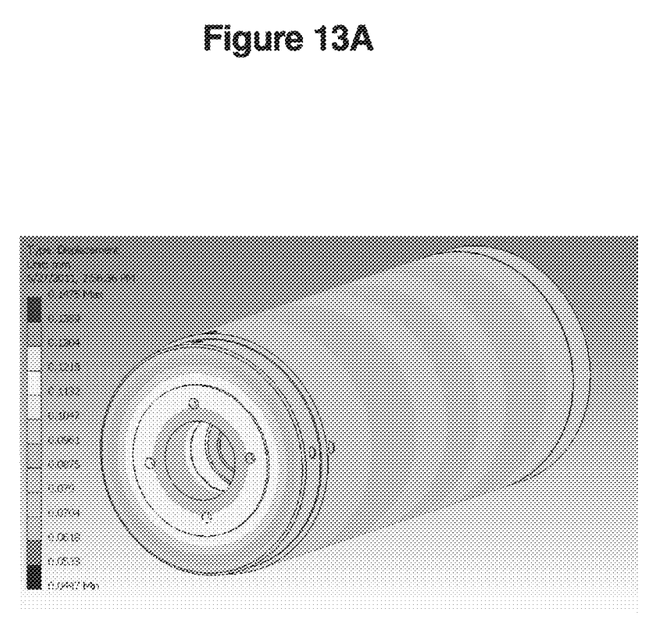
FIGS. 13A-13B show FEA Displacement Analysis results.
Figure 13B:
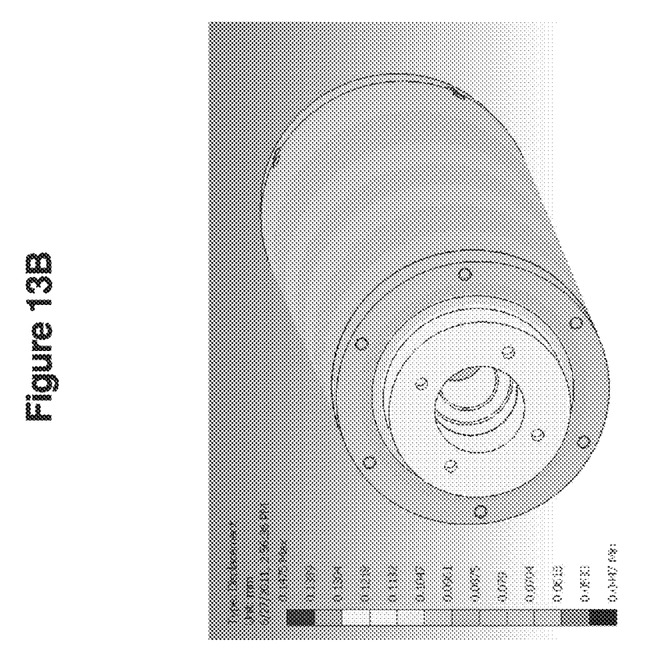

FIGS. 13A-13B show an FEA Displacement Analysis results. FEA (finite element analysis) displacement results shows little pressure related distortion at full ocean pressures. This result suggests the design rigidity while not lead to an O-ring failure/leak by.

Advantages and benefits of the invention may include, but are not limited to, the following:

1. New design features a pressure housing assembly that is easy to re-enter once it is assembled, if necessary, without damage to any components during dis-assembly and subsequent re-assembly.

2. New design is cylindrical in shape which is an optimum geometric shape for resistance to hydrostatic pressure and results in a more structurally strong pressure resistant housing. The finite element analysis (FEA) results are more predictable and reliable that a non-symmetrical polygon enclosure.

3. New design is a slide shell configuration that does not require internal structure to support end-cap axial load significantly reducing overall weight while maximizing usable interior volume.

4. Pressure vessel housing assembly is simple using fasteners and hand tools without the need for special equipment.

5. Reduced number of fasteners used when compared to an all bolted end cap or polygon shaped box-like construction of the same interior volume.

6. Does not require welding as some enclosures utilize for assembly of the case and cover.

7. New design does not de-rate material strength to an unpredictable value when welded and does not alter the corrosion resistant properties of the base metal as with welding.

8. New design does not require subsequent post weld heat treating to restore material strength and does not require post weld inspection and testing to the heat affected zone.

9. New design is modular such that if a longer housing is needed for additional interior volume only the slide cylinder component needs to be modified in overall length and substituted in the assembly.

10. New design has reduced aqueous barrier seal total overall length as opposed to a polygon shaped box and lid type construction of the same interior volume.

11. New design has all major components being coaxial for increased tensile load carrying capacity of the pressure vessel assembly.

12. New design is lighter than a polygon shaped pressure vessel of same interior volume with sufficient wall thickness to be comparable with cylindrical pressure vessel in terms of hydrostatic pressure resistance.

13. New design allows for improved access to all components on the interior of the pressure housing without the barrier of having to perform work on the components deep inside of a five sided "shoe-box" type vessel. Using the slide cylinder concept, removing the need for a heavy structural support between the end caps, and by sliding the cylinder up the cable and out of its normal assembled position the interior components are open for ease of access to all six sides of the assembly.

14. New design is more resistant to cable flexing and twisting forces compared to an off center "box like" pressure vessel attached to a cable.

15. New design can be easily converted to a single dead end enclosure with cable entry into one end only of the pressure housing by means of changing out one of the end caps.

16. The new design is a one atmosphere pressure vessel and is not internally pressure compensated to combat the effects of hydrostatic pressure. This eliminates the need for components and mechanisms required to provide internal pressure.

As mentioned above, although the exemplary embodiments described above are various undersea housings the general inventive concept should not be limited thereto, and it could also apply to other types of housings.

The invention claimed is:

1. A pressure apparatus comprising:
a first end cap;
a second end cap;
a hollow housing connected to said first and second end caps; a locking ring connected to said second end cap;
a first termination connected to said first end cap; and a second termination connected to said second end cap;
wherein
said housing comprises a shoulder, said shoulder having an inner diameter smaller than an outer diameter of second end cap, said outer diameter of the second being the largest diameter of the second end cap.

2. The pressure apparatus of claim 1 further comprising a bridge structure connected to at least one of said first and second end caps.

3. The pressure apparatus of claim 2 further comprising at least one of a fiber and electrical assembly connected to said bridge structure.

4. The pressure apparatus of claim 1, wherein said terminations are armored terminations.

5. The pressure apparatus of claim 1, wherein said terminations are epoxy glands.

6. The pressure apparatus of claim 1, wherein said terminations are penetrators.

7. The pressure apparatus of claim 1, wherein said housing is cylindrical.

8. The pressure apparatus of claim 1, wherein said locking ring axially aligns and seats said second end cap with said pressure apparatus.

9. The pressure apparatus of claim 1, wherein
said first end cap is removably fastened to said housing by one or more fasteners at a first end of said housing;
said second end cap is removably secured to said housing at a second end of said housing.

10. The pressure apparatus of claim 9, wherein
said second end cap comprises a threaded surface on an outer circumferential surface thereof configured to attach to said locking ring on an inner circumferential surface thereof.

11. The pressure apparatus of claim 10, wherein
said locking ring abuts an outer side surface of said shoulder of said housing, said outer side surface being perpendicular to a longitudinal axis of said housing.

12. The pressure apparatus of claim 1, wherein
said second end cap comprises a threaded surface on an outer circumferential surface thereof configured to attach to said locking ring on an inner circumferential surface thereof.

13. The pressure apparatus of claim 1, wherein
said locking ring abuts an outer side surface of said shoulder of said housing, said outer side surface being perpendicular to a longitudinal axis of said housing.

14. The pressure apparatus of claim 1, further comprising a bridge structure connected to both said first and second end caps.

\* \* \* \* \*